(12) United States Patent  (10) Patent No.: US 8,533,912 B2
Tran  (45) Date of Patent: Sep. 17, 2013

(54) GRAB HANDLE MOUNTING ASSEMBLY

(75) Inventor: Richard Tran, Kirkland, WA (US)

(73) Assignee: PACCAR Inc, Bellevue, WA (US)

( * ) Notice: Subject to any disclaimer, the term of this patent is extended or adjusted under 35 U.S.C. 154(b) by 14 days.

(21) Appl. No.: 13/306,020

(22) Filed: Nov. 29, 2011

(65) Prior Publication Data

US 2013/0133158 A1    May 30, 2013

(51) Int. Cl.
- B25G 1/10 (2006.01)
- H01M 2/10 (2006.01)
- A47K 3/024 (2006.01)
- A47H 1/02 (2006.01)

(52) U.S. Cl.
USPC ......... 16/110.1; 16/436; 16/444; 16/DIG. 41; 4/576.1; 211/105.1

(58) Field of Classification Search
USPC .......... 16/436, 444, DIG. 40, DIG. 41, 110.1; 29/525.01, 525.02; 248/407, 408, 413, 159; 211/6, 16, 88.04, 105.1, 105.4; 403/298, 403/348, 205; 4/604, 611, 576.1, 577.1; 296/214, 71, 1.02
See application file for complete search history.

(56) References Cited

U.S. PATENT DOCUMENTS

| | | | | | |
|---|---|---|---|---|---|
| 302,773 | A | * | 7/1884 | Peters | 248/251 |
| 305,140 | A | * | 9/1884 | Bradley | 285/396 |
| 1,345,170 | A | * | 6/1920 | Gross | 211/105.2 |
| 1,381,805 | A | * | 6/1921 | Crewdson | 403/359.1 |
| 1,932,099 | A | * | 10/1933 | Cabana | 403/202 |
| 2,056,309 | A | * | 10/1936 | Osenberg | 411/453 |
| 2,076,918 | A | * | 4/1937 | Robison | 285/82 |
| 2,297,390 | A | * | 9/1942 | Burger | 403/350 |
| 2,820,655 | A | * | 1/1958 | Hileman | 403/349 |
| 3,000,656 | A | * | 9/1961 | Hollaender | 403/298 |
| 3,156,977 | A | * | 11/1964 | Logan | 228/170 |
| 3,404,581 | A | * | 10/1968 | Kraus | 74/89.35 |
| 3,423,781 | A | * | 1/1969 | Henson | 15/145 |
| 3,569,689 | A | * | 3/1971 | Nestrock | 362/146 |
| 3,866,257 | A | * | 2/1975 | Cansdale, Sr. | 15/230.11 |
| 3,881,830 | A | * | 5/1975 | Kato et al. | 403/171 |
| 3,999,871 | A | * | 12/1976 | Palmer et al. | 403/71 |
| 4,318,352 | A | * | 3/1982 | Friedman et al. | 108/107 |
| 4,339,123 | A | * | 7/1982 | Rich | 482/28 |
| 4,501,380 | A | * | 2/1985 | Welch | 221/298 |
| H000176 | H | * | 12/1986 | Johnstone, Jr. | 285/31 |
| 4,632,195 | A | * | 12/1986 | Emmerich | 175/320 |
| 4,658,467 | A | | 4/1987 | Stolarz | |
| 4,663,802 | A | | 5/1987 | Kunzler | |
| 4,708,372 | A | * | 11/1987 | Arima et al. | 285/130.1 |

(Continued)

*Primary Examiner* — Victor Batson
*Assistant Examiner* — Jason W San
(74) *Attorney, Agent, or Firm* — Christensen O'Connor Johnson Kindness PLLC

(57) ABSTRACT

A grab handle mounting assembly securable to a mounting surface includes a first mounting arm assembly securable to a mounting surface. The first mounting arm assembly defines a first male pin. A second mounting arm assembly is securable to a mounting surface and defines a second male pin. The assembly further includes a first tube having first and second open ends, wherein the first male pin is mateable within the first open end of the first tube and the second male pin is mateable within the second open end of the first tube. When the first and second mounting arm assemblies are secured to a mounting surface with the first and second male pins mated with the first and second open ends of the first tube, the first and second mounting arm assemblies impose a torsional force on the first tube.

9 Claims, 7 Drawing Sheets

(56) References Cited

U.S. PATENT DOCUMENTS

| | | | |
|---|---|---|---|
| 4,721,407 A * | 1/1988 | Liu | 403/205 |
| 4,793,611 A * | 12/1988 | Thornell | 473/483 |
| 4,840,525 A | 6/1989 | Rebentisch | 411/85 |
| 5,094,464 A * | 3/1992 | Musacchia, Sr. | 473/582 |
| 5,133,617 A * | 7/1992 | Sokn et al. | 403/349 |
| 5,150,980 A * | 9/1992 | Lin | 403/24 |
| 5,186,197 A * | 2/1993 | Lavine | 135/25.4 |
| 5,396,740 A | 3/1995 | Bocchi | 52/33 |
| 5,572,907 A * | 11/1996 | Kaakinen | 74/489 |
| 5,690,237 A * | 11/1997 | Marzec | 211/105.1 |
| 5,779,228 A * | 7/1998 | Hansen | 256/65.05 |
| 6,003,202 A | 12/1999 | Dauterive | |
| 6,045,289 A * | 4/2000 | Tseng | 403/205 |
| 6,065,250 A * | 5/2000 | McCabe | 52/27 |
| 6,213,672 B1 | 4/2001 | Varga | 403/109.2 |
| 6,283,974 B1 * | 9/2001 | Alexander | 606/107 |
| 6,317,923 B1 * | 11/2001 | Lo | 16/110.1 |
| 6,343,808 B1 * | 2/2002 | Luh | 280/511 |
| 6,450,179 B2 | 9/2002 | Bengis | 132/297 |
| 6,536,301 B1 | 3/2003 | Luksch | |
| 6,546,272 B1 * | 4/2003 | MacKinnon et al. | 600/407 |
| 6,547,479 B2 * | 4/2003 | Dowling et al. | 403/359.2 |
| 6,604,885 B1 * | 8/2003 | Neuner | 403/359.2 |
| 6,644,567 B1 * | 11/2003 | Adams et al. | 239/566 |
| 6,802,544 B1 | 10/2004 | Lane | |
| 6,854,866 B1 * | 2/2005 | Liang | 362/399 |
| 6,892,042 B2 * | 5/2005 | Jang et al. | 399/167 |
| 6,925,686 B2 * | 8/2005 | Heathcock et al. | 16/429 |
| 6,964,439 B2 | 11/2005 | Nomura | |
| 7,086,115 B1 * | 8/2006 | Rex et al. | 15/144.1 |
| 7,124,451 B2 * | 10/2006 | Moore | 4/576.1 |
| 7,152,893 B2 | 12/2006 | Pudney | |
| 7,191,493 B2 | 3/2007 | Vanderpool | |
| 7,300,077 B2 * | 11/2007 | Tawara et al. | 285/417 |
| 7,344,168 B2 | 3/2008 | Matsubara | |
| 7,500,802 B2 * | 3/2009 | Patberg | 403/207 |
| 7,603,728 B2 * | 10/2009 | Roth | 4/577.1 |
| 7,926,772 B2 * | 4/2011 | Lowe et al. | 248/222.14 |
| 7,967,522 B2 * | 6/2011 | Goad | 403/292 |
| 8,129,462 B2 * | 3/2012 | Hsu et al. | 524/494 |
| 8,276,771 B2 * | 10/2012 | Schuetz et al. | 211/95 |
| 2002/0066164 A1 * | 6/2002 | White | 16/436 |
| 2002/0185148 A1 * | 12/2002 | Bengis | 132/297 |
| 2007/0216175 A1 | 9/2007 | Tanimoto | |
| 2008/0098510 A1 | 5/2008 | O'Brien | |
| 2008/0184475 A1 * | 8/2008 | Sladick et al. | 4/576.1 |
| 2011/0110716 A1 * | 5/2011 | Slater et al. | 403/348 |
| 2011/0227331 A1 * | 9/2011 | Church | 285/24 |

* cited by examiner

GRAB HANDLE MOUNTING ASSEMBLY

BACKGROUND

In prior art grab handle designs, a grab handle tube is traditionally mounted at each end to a handle mounting arm assembly, which is secured to the vehicle surface or other mounting surface using fasteners. Using fasteners to mount the grab handle tube to the handle mounting arm assembly increases the assembly part count for the vehicle.

It is also common to use a grab handle having an interior that is non-round to match a similarly non-round shaped pin on the handle mounting arm assembly. Although in this prior art design the grab handle tube is prevented from rotating or rattling with respect to the pins, the tube may still move axially with respect to the pins.

In other prior art designs, the grab handle is press-fit onto the pins. However, press-fitting the handle onto the pins requires additional equipment to bind the parts together.

Thus, it is desired to have a grab handle assembly that improves upon prior art designs by reducing the part number count for a vehicle assembly, by securing the grab handle tube to the handle mounting arm assemblies in a manner that substantially prevents rattling or axial movement of the tube when the vehicle is in motion, and by facilitating easy assembly.

SUMMARY

A grab handle mounting assembly securable to a mounting surface includes a first mounting arm assembly securable to a mounting surface. The first mounting arm assembly defines a first male pin. A second mounting arm assembly is securable to a mounting surface and defines a second male pin. The assembly further includes a first tube having first and second open ends, wherein the first male pin is mateable within the first open end of the first tube and the second male pin is mateable within the second open end of the first tube. When the first and second mounting arm assemblies are secured to a mounting surface with the first and second male pins mated with the first and second open ends of the first tube, the first and second mounting arm assemblies impose a torsional force on the first tube.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
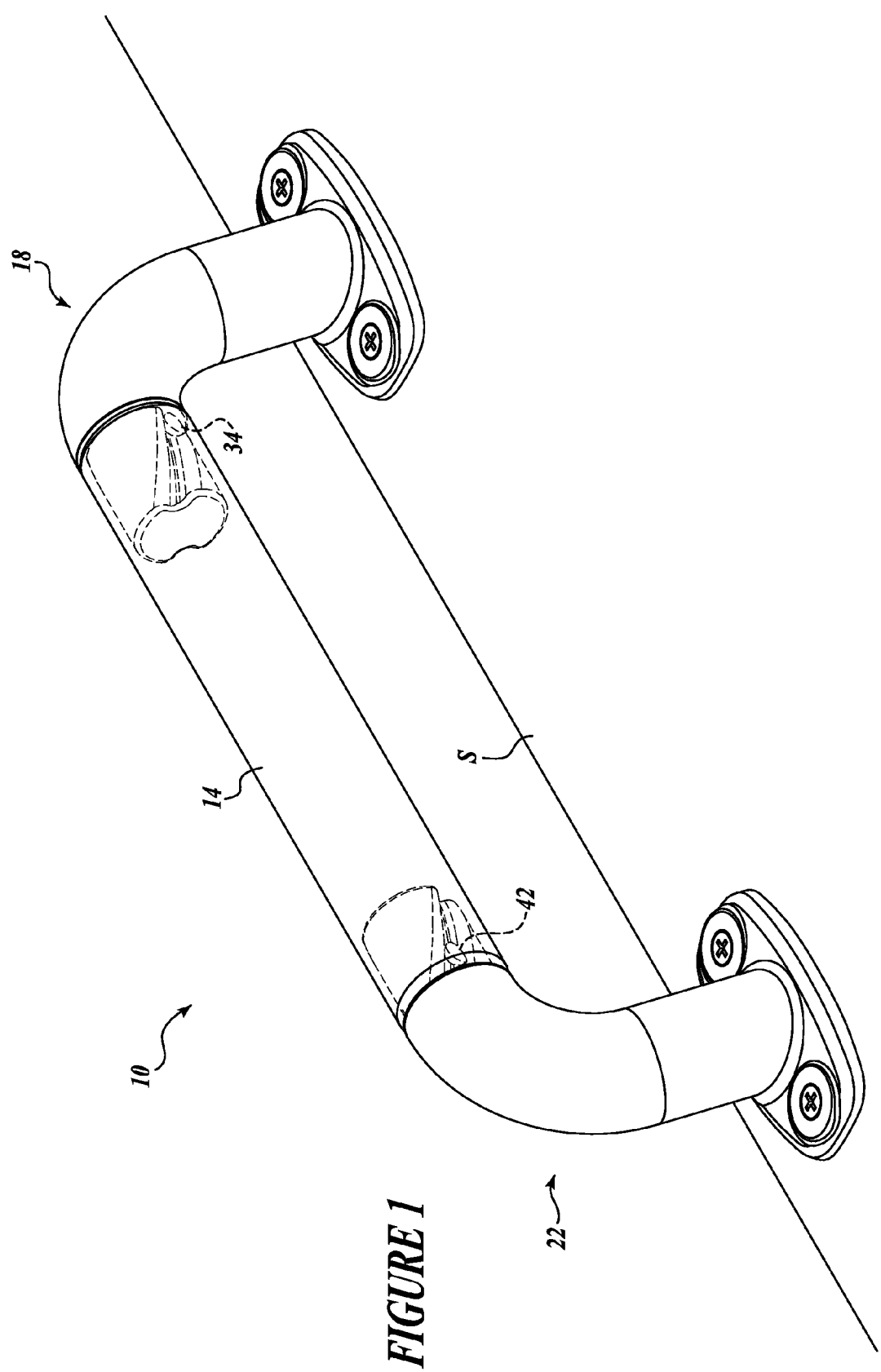
FIG. 1 is an isometric view of a grab handle mounting assembly formed in accordance with an exemplary embodiment of the present disclosure.
Figure 2:
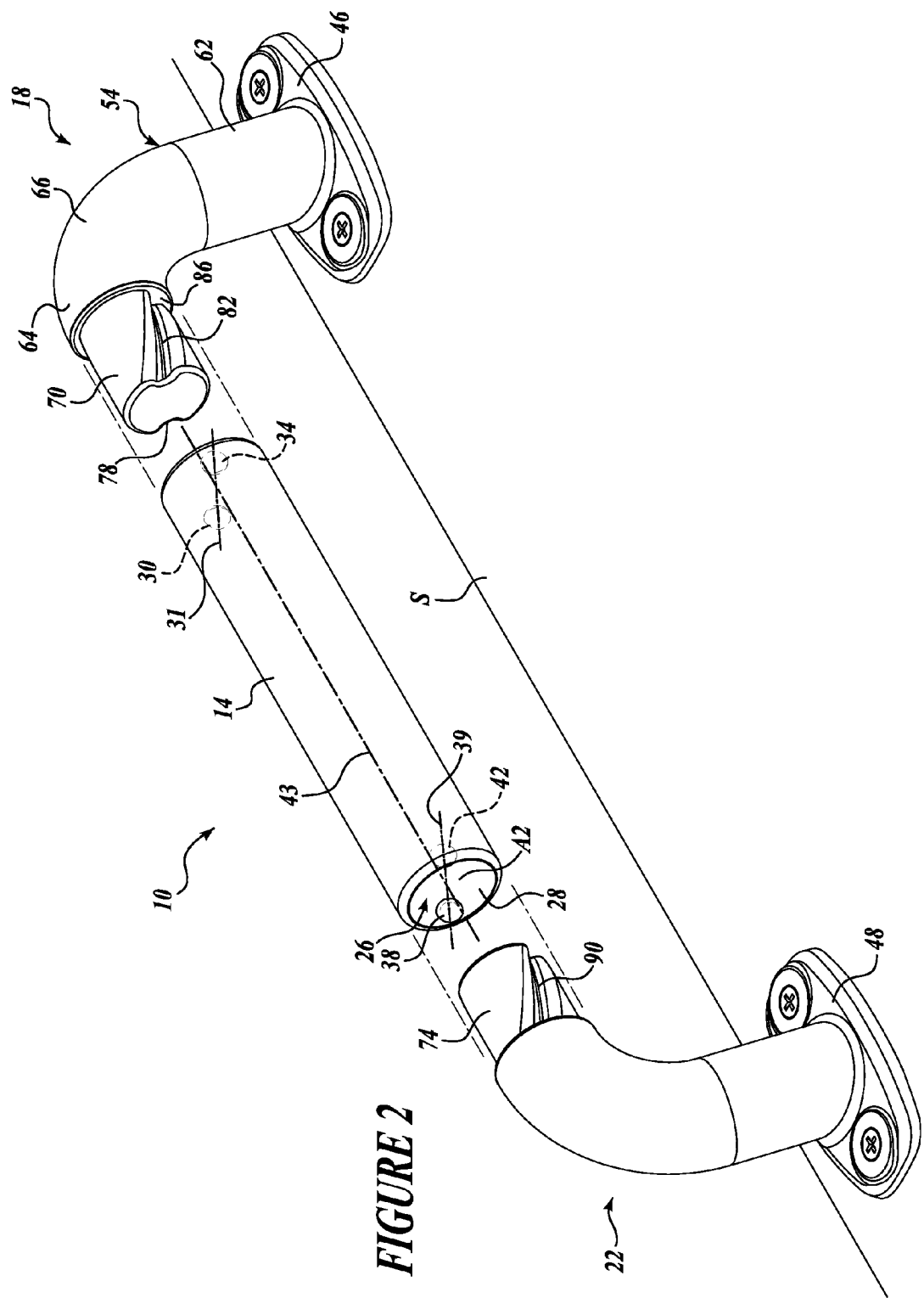
FIG. 2 is an exploded isometric view of the grab handle mounting assembly of FIG. 1.

A grab handle mounting assembly 10 formed in accordance with an exemplary embodiment of the present disclosure may best be seen by referring to FIGS. 1-2. The grab handle mounting assembly 10 generally includes a tube 14 engaged with and secured to first and second mounting arm assemblies 18 and 22. The mounting arm assemblies 18 and 22 are securable to a mounting surface S, such as an interior or exterior surface of a vehicle. The assembled tube 14 and first and second mounting arm assemblies 18 and 22 define a sturdy, substantially U-shaped grab handle that is simple to assemble.

Although the grab handle mounting assembly 10 will be hereinafter generally described for use with a vehicle, it should be appreciated that the grab handle mounting assembly 10 may be used for any suitable application that requires the use of a grab handle assembly securable to a mounting surface. Moreover, although the grab handle mounting assembly 10 is depicted as substantially U-shaped in configuration, the grab handle mounting assembly 10 may instead be any suitable shape and configuration without departing from the spirit and scope of the claimed subject matter.

Figure 3:
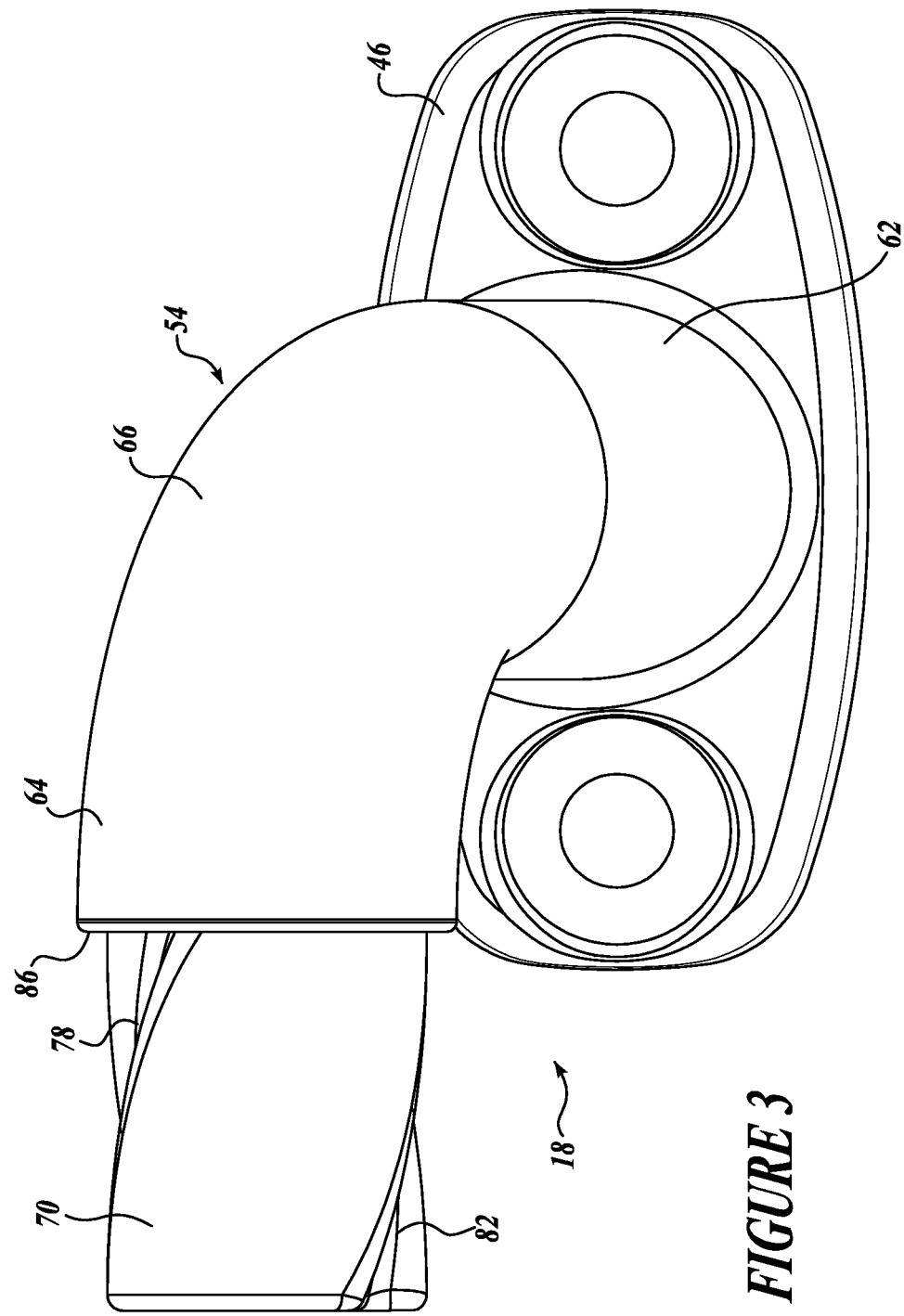
FIG. 3 is a top view of a mounting arm assembly formed in accordance with an exemplary embodiment of the present disclosure.

Referring to FIGS. 1-3, the grab handle mounting assembly 10 will now be described in detail. As noted above, the grab handle mounting assembly 10 generally includes a tube 14 mated with and secured to first and second mounting arm assemblies 18 and 22. The tube 14 is generally cylindrical in overall shape and includes a hollow interior 26 that is also generally cylindrical in shape or circular in cross-section. The tube 14 is of suitable length and overall diameter to define a handle or bar portion suitable for the intended application. For instance, the tube 14 may be of a suitable length and diameter such that it is graspable by a user (to define, for instance, a handle bar on the interior or exterior of a vehicle).

Referring specifically to FIG. 2, the tube 14 includes a first pair of opposing protrusions or first and second dimples 30 and 34 formed on or otherwise defined on a tube interior surface 38 at a first end of the tube 14, and a second pair of opposing protrusions or third and fourth dimples 38 and 42 formed on or otherwise defined on the tube interior surface 38 at a second end of the tube 14. If the tube 14 is formed from a material such as sheet metal, the dimples may be formed on the interior of the tube 14 in any suitable manner, such as by punching or other forming processes.

The first and second dimples 30 and 34 are engageable with grooves or channels formed within the first mounting arm assembly 18 when the tube 14 is mated with the first mounting arm assembly 18. Similarly, the third and fourth dimples 38 and 42 are formed on the interior surface 38 of the tube 14 near a second end opening of the tube 14 so that they are engageable with grooves or channels formed within the second mounting arm assembly 22 when the tube 14 is mated with the second mounting arm assembly 22.

Referring again to FIGS. 1-3, the first and second mounting arm assemblies 18 and 22 suitable for securely mating with the tube 14 and for securing the tube 14 to a mounting surface S will now be described in detail. The first and second mounting arm assemblies 18 and 22 may be formed from any suitable material and method, such as by using a mold to form a casting. The first and second mounting arm assemblies 18 and 22 include first and second mounting feet 62 and 66, respectively, that are configured to be secured to a mounting surface S, such as an interior or exterior surface of a vehicle. The mounting feet 62 and 66 may be any suitable shape and configuration, and they include means for securing the mounting feet 62 and 66 to the mounting surface S. The means may include, for example, openings passing transversely through the mounting feet 62 and 66 that are configured to receive fasteners therein, wherein the fasteners may be secured to the mounting surface S.

As noted above, the first and second mounting arm assemblies 18 and 22 are suitable for securely mating with the tube 14. In that regard, the first and second mounting arm assemblies 18 and 22 include curved first and second arms 46 and 48 extending upwardly from the first and second mounting feet 62 and 66. More specifically, the first and second arms 46 and 48 each include a vertical portion 62 extending substantially transversely upwardly from the first and second mounting feet 62 and 66, a horizontal portion 64 extending substantially transversely from the vertical portion, and a curved portion 66 extending between the vertical portion 62 and the horizontal portion 64.

The first and second arms 46 and 48 are substantially circular in cross section and are substantially equal in diameter to the outer diameter of the tube 14. The first and second arms 46 and 48 terminate in first and second male pins 70 and 74, respectively, which are mateable with the first and second female open ends of the tube 14. In this regard, when the first and second pins 70 and 74 are mated with the first and second female open ends of the tube 14, the curved first and second arms 46 and 48 and the tube 14 collectively define the substantially U-shaped grab handle mounting assembly 10.

The first and second pins 70 and 74 extend from the first and second curved arms 54 and 58, respectively, such that the first and second pins 70 and 74 define a pin axis that is substantially parallel with the mounting surface S when the first and second mounting feet 62 and 66 are secured to the mounting surface S. The first and second pins 70 and 74 are substantially cylindrical in overall shape, and each pin has an outer diameter that is substantially equal to the inner diameter of the tube 14. The first and second pins 70 and 74 may each be of any suitable length such that they extend within the interior 26 of the tube 14 a predetermined amount for suitably mating with the tube 14.

To securely mate with the tube 14, each pin 70 and 74 includes a pair of grooves or channels that are engageable with the dimples formed on the interior surface 28 of the tube 14. More specifically, the first pin 70 includes first and second substantially congruent geometrical helical grooves or channels 54 and 58 extending along the length of the first pin 70 and having the same first pin axis, differing by a translation along the first pin axis. The first and second helical channels 78 and 82 have a suitable depth and width to receive the first and second dimples 30 and 34 therein. The first and second helical channels 78 and 82 extend along the length of the first pin 70 from the distal free edge of the first pin 70 toward the intersection of the first pin 70 and the first curved arm 54. In that regard, to mate the tube 14 with the first pin 70, the tube 14 is moved axially toward the first pin 70 while twisting or rotating the tube 14 clockwise to allow the first and second dimples 30 and 34 to travel helically within the first and second channels 78 and 82 (see FIG. 4A).

The second pin 74 is substantially identical to the first pin 70 in that it includes third and fourth substantially congruent geometrical helical grooves or channels (only a fourth channel 90 shown in the FIGURES for ease of illustration) extending along the length of the second pin 74 that are configured to receive the third and fourth dimples 38 and 42 therein. The third and fourth channels similarly have the same second pin axis, differing by a translation along the second pin axis, and extend helically along the length of the second pin 74. In that regard, to mate the second pin 74 of the second curved arm 58 with the tube 14, the second pin 74 may be moved axially toward the tube 14 and twisted or rotated clockwise to allow the third and fourth dimples 38 and 42 to travel helically within the third and fourth channels, as shown in FIG. 4B.

The third and fourth dimples 38 and 42, however, are formed along a different axis from the first and second les 30 and 34. More specifically, the third and fourth dimples 38 and 42 are formed along a first axis 39 substantially transverse to a longitudinal axis 43 of the tube 14, and the first and second dimples 30 and 34 are formed along a second axis 31 substantially transverse to the longitudinal axis 43 of the tube 14. However, the first axis 39 of the third and fourth dimples 38 and 42 is substantially parallel to the mounting surface S, and the second axis 31 of the first and second 30 and 34 is slightly misaligned from the first axis 39 of the third and fourth dimples 38 and 42. In this manner, when the second pin 74 of the second mounting arm assembly 22 is mated with the tube 14, the second mounting foot 48 is not coplanar with the first mounting foot 46. Rather, the second mounting arm assembly 22 is offset from the first mounting arm assembly 18 to define an angle α between the second mounting foot 48 and the mounting surface S, as shown in FIG. 4B (see the second mounting arm assembly 22 shown in solid lines) and 4C (see the second mounting arm assembly 22 shown in dashed lines).

A transverse shoulder 86 may be defined at the intersection of each of the first and second pins 70 and 74 and the horizontal portion 64 of the first and second curve arms 46 and 48. The transverse shoulder 86 abuts the end of the tube 14 when the first and second pins 70 and 74 are fully received within the tube 14, or when the tube 14 bottoms out against the transverse shoulder 86. In this manner, the transverse shoulder 86 may provide both visual and tactile feedback to indicate that the first and second pins 70 and 74 are fully received within the tube 14. Moreover, with the first and second curved arms 54 and 58 being substantially equal in diameter to the outer diameter of the tube 14, the outer surfaces of the first and second curved arms 54 and 58 are substantially flush with the outer surface of the tube 14 when mated thereto.

Figure 4A:
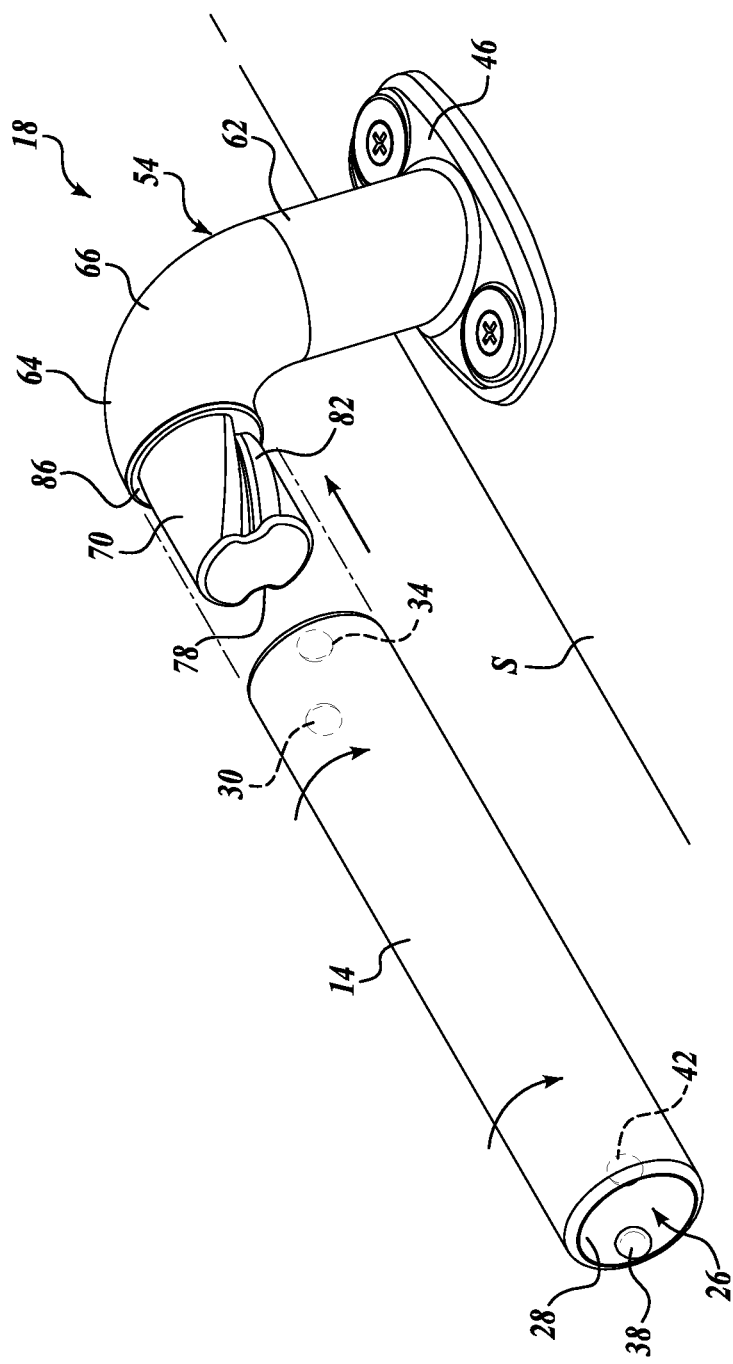
FIG. 4A is a partially exploded isometric view of the grab handle mounting assembly of FIG. 1, wherein a tube is shown being engaged with a first mounting arm assembly.
Figure 4B:
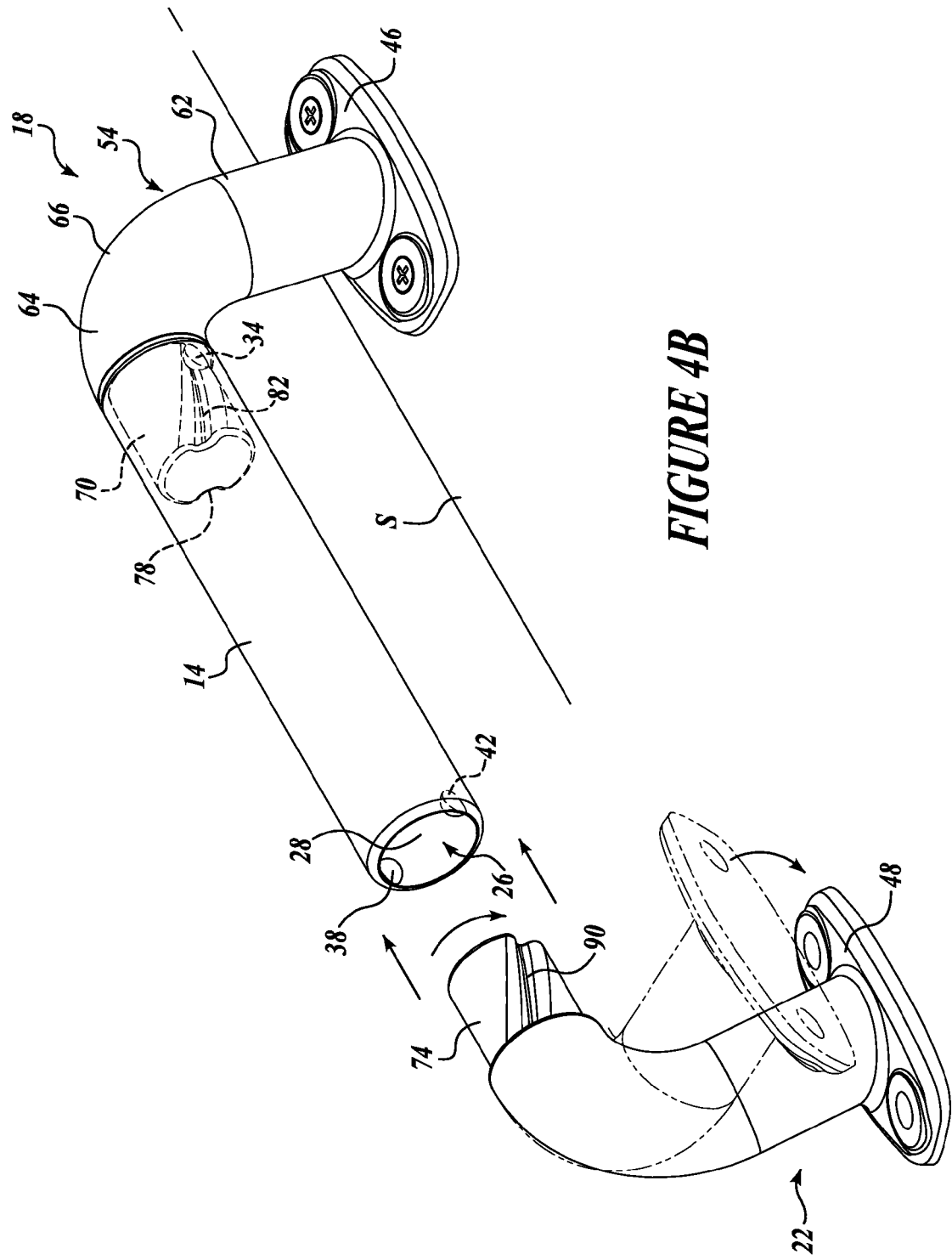
FIG. 4B is a partially exploded isometric view of the grab handle mounting assembly of FIG. 1, wherein the tube is shown engaged with the first mounting arm assembly and a second mounting arm assembly is shown being engaged with the tube.
Figure 4C:
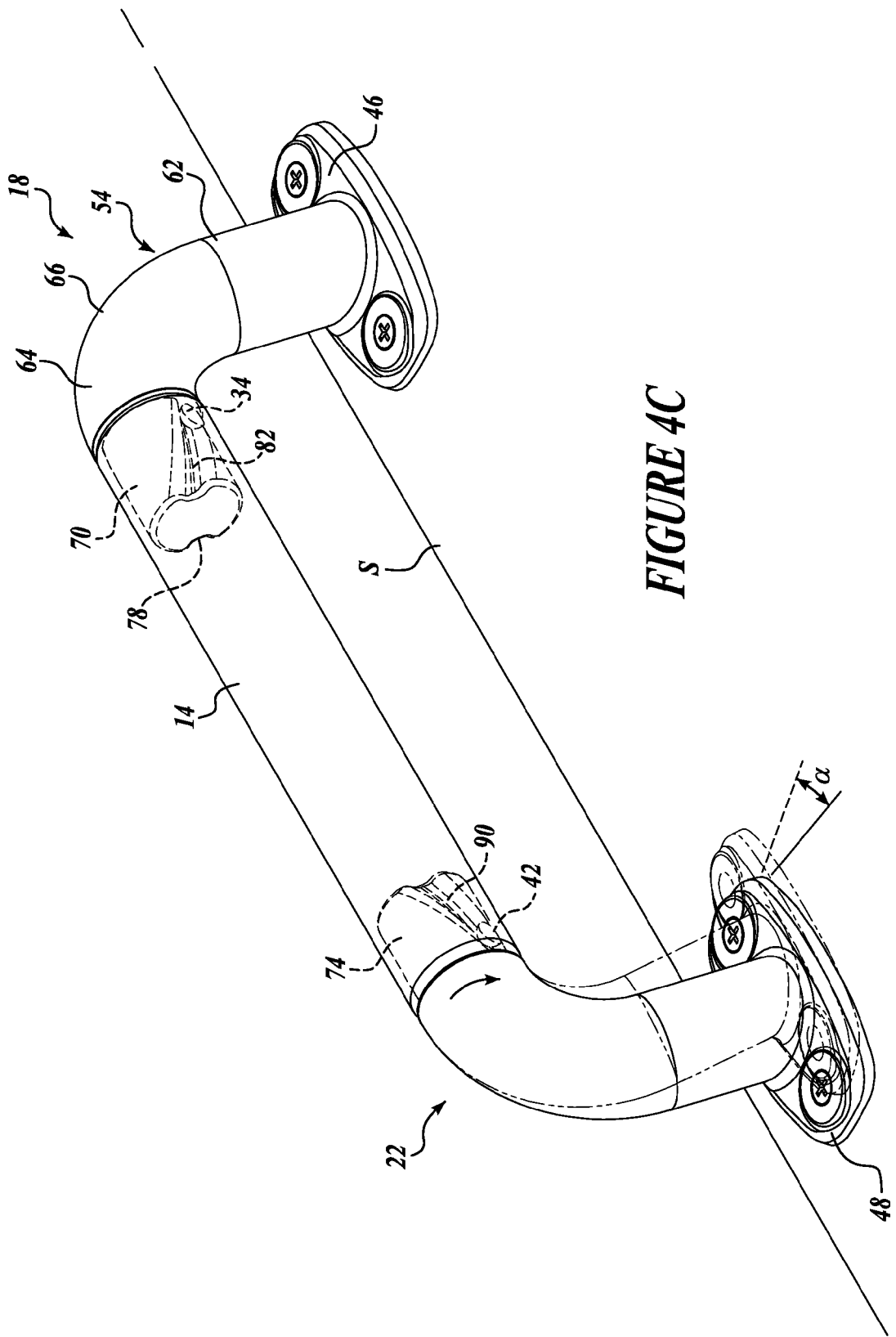
FIG. 4C is an isometric view of the grab handle mounting assembly of FIG. 1, wherein the tube is shown engaged with the first and second mounting arm assemblies and the second mounting arm assembly is shown being engaged with a mounting surface.

Referring to FIGS. 4A-4C, assembly of the grab handle mounting assembly 10 will now be described. Referring first to FIG. 4A, the first mounting arm assembly 18 is secured to a mounting surface S by any suitable means. For instance, the first mounting foot 46 may be secured to the mounting surface S by passing fasteners through openings in the first mounting foot 46 and thereafter securing the fasteners into the mounting surface S.

With the first mounting arm assembly 18 secured to the mounting surface S, the tube 14 may then be mated with the first pin 70. In particular, the first end of the tube 14 is positioned relative to the first pin 70 such that the first and second dimples 30 and 34 are substantially aligned with the first and second channels 78 and 82. The tube 14 may then be moved axially toward the first pin 70 until the first pin 70 enters the first open end of the tube 14.

When the first pin 70 is received within the first open end of the tube 14, the first and second dimples 30 and 34 begin to travel within the first and second channels 78 and 82. In this regard, the tube 14 is moved axially toward the transverse shoulder 86 (defined between the first pin 70 and the first curved arm 54) while at the same time being rotated clockwise to allow the first and second dimples 30 and 34 to travel helically within the first and second channels 78 and 82. The tube 14 is moved in this manner until the edge of the tube 14 is substantially seated against the transverse shoulder 86 of the first curved arm 54, as shown in FIG. 4B.

Referring to FIG. 4B, with the tube 14 mated with the first pin 70 of the first mounting arm assembly 18, the second mounting arm assembly 22 may now be mated with the tube 14. To mate the second mounting arm assembly 22 with the tube 14, the second pin 74 is positioned relative to the second end of the tube 14 such that the third and fourth dimples 38 and 42 are substantially aligned with the third and fourth channels (only the fourth channel 90 labeled). The second pin 74 may then be moved axially toward the second end of the tube 14 until the second pin 74 enters the second open end of the tube 14.

When the second pin 74 is received within the second open end of the tube 14, the third and fourth dimples 38 and 42 begin to travel within the third and fourth channels on the interior of the tube 14. In this regard, the second pin 74 is moved axially toward the second end of the tube 14 while at the same time being rotated clockwise to allow the third and fourth dimples 38 and 42 to travel helically within the third and fourth channels. The second pin 74 is moved in this manner until the transverse shoulder of the second mounting arm assembly 22 (not shown) is substantially seated against the edge of the second end of the tube 14, as shown in FIG. 4C. With the ends of the tube 14 seated against the transverse shoulders of the first and second mounting arm assemblies 18 and 22, the tube 18 is substantially prevented from moving axially with respect to the first and second pins 70 and 74.

Referring to FIG. 4C, with the second mounting arm assembly 22 mated with the second end of the tube 14, the second mounting foot 48 is not coplanar with the first mounting foot 46, as noted above. Rather, as noted above, the first axis 39 of the third and fourth dimples 38 and 42 are slightly misaligned from the second axis 31 of the first and second dimples 30 and 34. In this manner, the second mounting arm assembly 22 is offset from the first mounting arm assembly 18 to define an angle α between the second mounting foot 48 and the mounting surface S. Thus, when fasteners are passed through openings in the second mounting foot 48 to secure the second mounting foot 48 to the mounting surface S, a torsional force is applied to the tube 14 through the second mounting arm assembly 22.

The third and fourth dimples 38 and 42 are sufficiently misaligned from the first and second dimples 30 and 34 to apply a torsional force on the tube 14 and to slightly deform the tube 14. In this manner, the tube 14 is prevented from moving or rattling relative to the first and second pins 70 and 74, such as when the vehicle is moving or when a user grasps the tube 14. However, the misalignment between the third and fourth dimples 38 and 42 and the first and second dimples 30 and 34 is not so great that the dimples 30, 34, 38, and 42 or the channels 78, 82, and 90 are deformed when applying the torsional force. It should be understood that the misalignment may instead be present between the first and second channels 78 and 82 of the first pin 70 and the third and fourth channels (only channel 90 labeled) of the second pin 74 to effectuate the torsional force.

It should be appreciated that the combination of the pin channel helical design and the misalignment of the tube dimples effectuates the torsional force on the tube 114 to secure the tube 114 in its location relation to the first and second mounting arm assemblies 118 and 120. As such, the tube 114 can be secured to the mounting arm assemblies 118 and 120 to define a grab handle assembly 110 with a minimal amount of fasteners.

Figure 5:
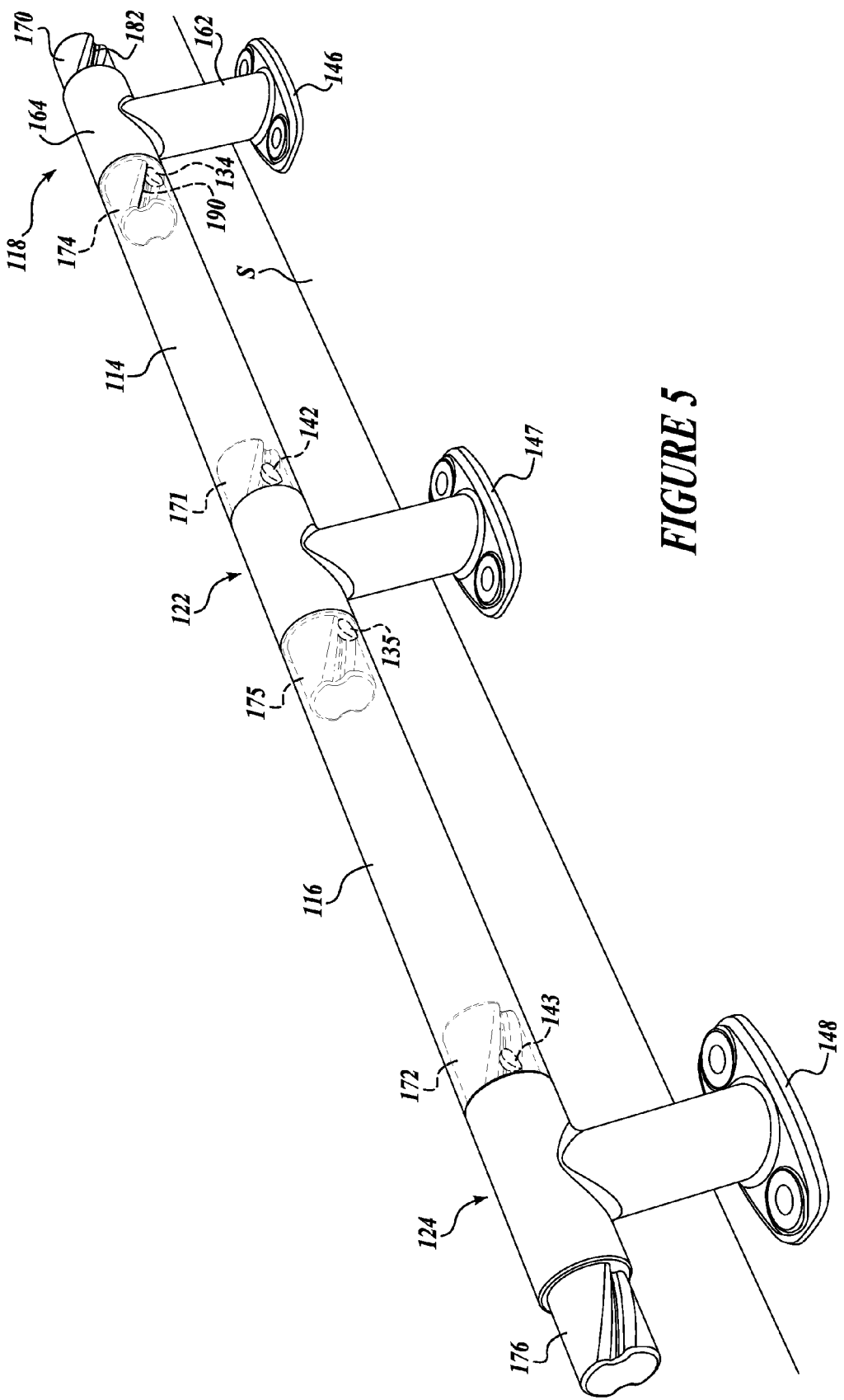
FIG. 5 is an isometric view of a grab handle mounting assembly formed in accordance with an alternative embodiment of the present disclosure.

Referring to FIG. 5, an alternative embodiment of an elongated grab handle mounting assembly 110 having a plurality of tubes defining a plurality of handle portions graspable by a user is depicted. The grab handle mounting assembly 110 is substantially identical to the grab handle mounting assembly 10 described above except for the differences hereinafter provided. The grab handle mounting assembly 110 generally includes a plurality of tubes 114, 116, etc., engaged with and secured to first, second, and third mounting arm assemblies 118, 122, and 124. The mounting arm assemblies 118, 122, and 124 are securable to a mounting surface S, such as an interior or exterior surface of a vehicle. The tubes 114, 116, etc., are assembled with the first, second, and third mounting arm assemblies 118, 122, and 124 define a sturdy, substantially U-shaped elongated grab handle assembly that is simple to assemble.

Referring still to FIG. 5, the first mounting arm assembly 118 will now be described in detail. The first mounting arm assembly 118 includes a first mounting foot 146 securable to a mounting surface, and a vertical portion 162 extending substantially transversely upwardly from the first mounting foot 146. A horizontal portion 164 intersects the upper end of the vertical portion 162 and extends laterally outwardly from either side of the vertical portion 162 to define a substantially T-shaped arm of the first mounting arm assembly 118.

First and second pins 170 and 174 extend axially from each end of the horizontal portion 164. The first and second pins 170 and 174 are substantially identical to the first and second pins 70 and 74 described above. More specifically, each pin 170 and 174 includes substantially congruent geometrical helical grooves or channels (only a channel 182 shown on pin 170 and a channel 190 shown on pin 174 in FIG. 5 for ease of illustration extending along the length of the first and second pins 170 and 174 and have the same pin axis, differing by a translation along the pin axis. In this manner, each pin 170 and 174 is configured to receive dimples (only second and fourth dimples 134 and 142 depicted) formed on the interior surface of the tube 114.

As can be seen in FIG. 5, a portion of the grab handle mounting assembly 110 is assembled by mating a first end of the tube 114 with the second pin 174 of the first mounting arm assembly 118. The tube 114 is mated with the second pin 174 (with second dimple 134 shown) in substantially the same manner that the tube 14 is mated with the first pin 70 described above. A first pin 171 of the second mounting arm assembly 122 is thereafter mated with the second end of the tube 114 (with fourth dimple 142 shown) in substantially the same manner that the second pin 74 is mated with the tube 14 as described above. Thereafter, the second mounting foot 147 of the second mounting arm assembly 122 is secured to the mounting surface to impose a torsional force on the tube 114, thereby securing the tube 114 in its position relative to the first and second mounting arm assemblies 118 and 122.

A first end of a second tube 116 (with second dimple 135 shown) may then be mated with a second pin 175 of the second mounting arm assembly 122, and a first pin 172 of the third mounting arm assembly 124 may then be mated with a second end of the second tube 116 (with fourth dimple 143 shown). The mounting foot 148 of the third mounting arm assembly 124 is thereafter secured to the mounting surface to impose a torsional force on the second tube 116, thereby securing the second tube 114 in its position relative to the second and third mounting arm assemblies 122 and 124. An additional tube may be secured to a second pin 176 of the third mounting arm assembly 124, and thereafter to an additional mounting arm assembly to increase the length of the grab handle mounting assembly 110 as desired. To terminate the grab handle mounting assembly 110, a mounting arm assembly having no second pin extending outwardly opposite the first pin may be used.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A grab handle mounting assembly securable to a mounting surface, comprising:
   (a) a first mounting arm assembly securable to the mounting surface, the first mounting arm assembly defining a first male pin, the first male pin having first and second opposing helical channels extending along at least a portion of the first male pin;
   (b) a second mounting arm assembly securable to the mounting surface, the second mounting arm assembly defining a second male pin, the second male pin having third and fourth opposing helical channels extending along at least a portion of the second mate pin;
   (c) a first tube having first and second open ends and first and second protrusions formed on an interior surface of the first tube near the first open end and third and fourth protrusions formed on an interior surface of the first tube near the second open end, wherein the first male pin is receivable within the first open end of the first tube such that the first and second protrusions are disposed within the first and opposing helical second channels and the second male pin is receivable within the second open end of the first tube such that the third and fourth protrusions are disposed within the third and fourth opposing helical channels; and
   (d) wherein when the first and second mounting arm assemblies are secured to the mounting surface with the first and second male pins received within the first tube, the first and second mounting arm assemblies impose a torsional force on the first tube.

2. The grab handle assembly of claim 1, wherein the first and second protrusions are formed along a first axis substantially transverse to a longitudinal axis of the first tube and the third and fourth protrusions are formed along a second axis substantially transverse to the longitudinal axis of the first tube.

3. The grab handle assembly of claim 1, wherein the first and second opposing helical channels are substantially congruent geometrical helical channels and the third and fourth opposing helical channels are substantially congruent geometrical helical channels.

4. The grab handle assembly of claim 3, further comprising:
   (a) a third male pin defined on the second mounting arm assembly;
   (b) a third mounting arm assembly having a fourth male pin; and
   (c) a second tube having first and second open ends, wherein the third male pin is mateable within the first open end of the second tube and the fourth male pin is mateable within the second open end of the second tube, wherein when the second and third mounting arm assemblies are secured to the mounting surface with the third and fourth male pins mated with the first and second open ends of the second tube, the second and third mounting arm assemblies impose a torsional force on the second tube.

5. A method of installing a grab handle assembly, the method comprising:
   (a) securing a first mounting arm assembly to a mounting surface, the first mounting arm assembly defining a first male pin having first and second opposing helical channels extending along at least a portion of the first male pin;
   (b) providing a first tube having first and second open ends, wherein the first tube has first and second protrusions formed on an interior surface of the first tube near the first open end and third and fourth protrusions formed on an interior surface of the first tube near the second open end, wherein the first male pin is receivable within the first open end of the first tube such that the first and second protrusions are disposed within the first and second opposing helical channels;
   (c) mating the first open end of the first tube with the first male pin;
   (d) providing a second mounting arm assembly defining a second male pin having third and fourth opposing helical channels extending along at least a portion of the second male pin, wherein the second male pin is receivable within the second open end of the first tube such that the third and fourth protrusions are disposed within the third and fourth opposing helical channels;
   (e) mating the second male pin within the second open end of the first tube; and
   (f) securing the second mounting arm assembly to the mounting surface to impose a torsional force on the first tube.

6. The method of claim 5, wherein the first and second protrusions are formed along a first axis substantially transverse to a longitudinal axis of the first tube and the third and fourth protrusions are formed along a second axis substantially transverse to the longitudinal axis of the first tube.

7. The method of claim 5, wherein the first and second opposing helical channels are substantially congruent geometrical helical channels and the third and fourth opposing helical channels are substantially congruent geometrical helical channels.

8. The method of claim 5, wherein the second mounting arm assembly further includes a third male pin.

9. The method of claim 8, further comprising:
   (a) providing a second tube having first and second open ends;
   (b) mating the first open end of the second tube with the third male pin;
   (c) providing a third mounting arm assembly having a fourth male pin;
   (d) mating the fourth male pin within the second open end of the second tube; and
   (e) securing the third mounting arm assembly to the mounting surface to impose a torsional force on the second tube.

* * * * *

UNITED STATES PATENT AND TRADEMARK OFFICE
CERTIFICATE OF CORRECTION

| | |
|---|---|
| PATENT NO. | : 8,533,912 B2 |
| APPLICATION NO. | : 13/306020 |
| DATED | : September 17, 2013 |
| INVENTOR(S) | : R. Tran |

Page 1 of 1

It is certified that error appears in the above-identified patent and that said Letters Patent is hereby corrected as shown below:

In the Claims:

| COLUMN | LINE | ERROR |
|---|---|---|
| 7 (Claim 1, | 33 line 12) | "mate" should read --male-- |

Signed and Sealed this
Seventeenth Day of June, 2014

Michelle K. Lee
*Deputy Director of the United States Patent and Trademark Office*